United States Patent
Konishi

(10) Patent No.: US 7,315,403 B2
(45) Date of Patent: Jan. 1, 2008

(54) IMAGE DATA SORTING SYSTEM AND METHOD THEREOF

(75) Inventor: Masahiro Konishi, Saitama (JP)

(73) Assignee: Fujifilm Corporation, Tokyo (JP)

( * ) Notice: Subject to any disclaimer, the term of this patent is extended or adjusted under 35 U.S.C. 154(b) by 1216 days.

(21) Appl. No.: 09/898,012

(22) Filed: Jul. 5, 2001

(65) Prior Publication Data

US 2002/0054328 A1 May 9, 2002

(30) Foreign Application Priority Data

Jul. 5, 2000 (JP) .............................. 2000-203195

(51) Int. Cl.
- *H04N 1/387* (2006.01)
- *G06F 15/16* (2006.01)
- *G06F 15/82* (2006.01)
- *G06K 15/00* (2006.01)
- *G06K 15/02* (2006.01)

(52) U.S. Cl. ...................... 358/403; 358/1.15; 358/1.18

(58) Field of Classification Search ...................... None
See application file for complete search history.

(56) References Cited

U.S. PATENT DOCUMENTS

| | | | | |
|---|---|---|---|---|
| 4,943,868 | A * | 7/1990 | Yoshinaga et al. | 358/403 |
| 5,045,880 | A * | 9/1991 | Evanitsky et al. | 399/82 |
| 5,051,736 | A * | 9/1991 | Bennett et al. | 345/180 |
| 5,442,732 | A * | 8/1995 | Matysek et al. | 358/1.17 |
| 5,448,375 | A * | 9/1995 | Cooper et al. | 358/403 |
| 5,737,504 | A * | 4/1998 | Yamada | 358/1.18 |
| 5,850,214 | A * | 12/1998 | McNally et al. | 345/173 |
| 6,064,496 | A * | 5/2000 | Kerschner et al. | 358/471 |
| 6,137,590 | A * | 10/2000 | Mori | 358/1.17 |
| 6,141,111 | A * | 10/2000 | Kato | 358/1.15 |
| 6,167,439 | A * | 12/2000 | Levine et al. | 709/217 |
| 6,288,719 | B1 * | 9/2001 | Squilla et al. | 715/805 |
| 6,362,900 | B1 * | 3/2002 | Squilla et al. | 358/442 |
| 6,377,715 | B1 * | 4/2002 | Fujieda et al. | 382/314 |
| 6,396,963 | B2 * | 5/2002 | Shaffer et al. | 382/305 |
| 6,750,978 | B1 * | 6/2004 | Marggraff et al. | 358/1.12 |
| 6,788,293 | B1 * | 9/2004 | Silverbrook et al. | 345/173 |
| 6,980,202 | B2 * | 12/2005 | Carro | 345/173 |
| 7,009,726 | B2 * | 3/2006 | Lumley | 358/1.15 |
| 7,019,319 | B2 * | 3/2006 | Lapstun et al. | 250/566 |
| 7,154,622 | B2 * | 12/2006 | Constantin et al. | 358/1.15 |

FOREIGN PATENT DOCUMENTS

| | | |
|---|---|---|
| JP | A8-202607 | 8/1996 |
| JP | A11-164234 | 6/1999 |
| JP | 2002027364 A * | 1/2002 |

* cited by examiner

*Primary Examiner*—Twyler Lamb
*Assistant Examiner*—Myles D. Robinson
(74) *Attorney, Agent, or Firm*—Birch, Stewart, Kolasch & Birch, LLP

(57) ABSTRACT

An image sorting system storing a plurality of image data, comprising a management apparatus for managing the plurality of image data using a management folder, and an image selecting device for selecting from a print out one of the plurality of image data by detecting an identifier which corresponds to a printed image of the one of the plurality of image data on the print out, wherein the management apparatus manages the plurality of image data by sending to the management folder the one of the plurality of image data selected by the image selecting device.

15 Claims, 14 Drawing Sheets

IMAGE DATA SORTING SYSTEM AND METHOD THEREOF

This patent application claims priority from a Japanese patent application No. 2000-203195 filed on Jul. 5, 2000, the contents of which are incorporated herein by reference.

BACKGROUND OF THE INVENTION

1. Field of the Invention

The present invention relates to an image data sorting system and the method thereof. In particular, the present invention relates to the image data sorting system sorting a large amount of image data that is captured by a digital still camera effectively, conveniently, and quickly.

2. Description of the Related Art

Conventionally, when a large number of photographs using a film are sorted, each of the images is printed from a silver film into photograph form, the printed photographs are arranged on a desk, and the user often sorts the images by looking at the printed photographs. On the other hand, when a plurality of digital images is sorted by a computer, the user usually looks at the digital images that are displayed. Japanese Patent Application Laying-Open No. H8-202607 discloses, when sorting the digital images, a method for managing the sorted image data by using a unit of a folder. Japanese Patent Application Laying-Open No. H11-164234 discloses a method for sorting the image data into a folder automatically based on attached information such as the image capturing data. When the user wants to sort the image data based on the target captured in the image or the visibility of the target in the image, the images before sorting are indicated on the display. If a large amount of image data is displayed at once, each of the images indicated on the display is very difficult to see. Therefore, to select a certain image, the user requires to look at the plurality of images and compare the image data indicated on the display, therefore sorting the image data requires a lot of time and causes a lot of problems.

If the user selects images to be a larger size on the display, the number of indicated images on the display decreases. This is different from sorting the photographs on the desk, because the amount of image data recognized at once decreases so that the sorting efficiency becomes inferior. In particular, the image for the construction report often captures a large amount of image data, and sorting the image data for the construction report requires processing of a large amount of image data, so that sorting the image data requires a lot of time and a high workload.

If all the image data is printed out and then sorted, matching the printed image with the indicated image data on the display requires a lot of attention and the matching is quite problematic.

SUMMARY OF THE INVENTION

Therefore, it is an object of the present invention to provide an image sorting system and method thereof, which is capable of overcoming the above drawbacks accompanying the conventional art. In particular, the present invention aims to effectively sort a large amount of image data which is captured by the digital still camera for a construction report such as a construction, a survey, a soil investigation, an advertisement, and a design and soon. The above and other objects can be achieved by combinations described in the independent claims. The dependent claims define further advantageous and exemplary combinations of the present invention.

According to the first aspect of the present invention, an image sorting system storing a plurality of image data may comprise a management apparatus for managing the plurality of image data using a management folder, and an image selecting device for selecting from a print out one of the plurality of image data by detecting an identifier which corresponds to a printed image of the one of the plurality of image data on the print out, wherein the management apparatus manages the plurality of image data by sending to the management folder the one of the plurality of image data selected by the image selecting device.

The management apparatus may generate arrangement information for arranging the plurality of image data corresponding to the identifier on the print out, and the management apparatus may have a printer output section which prompts a printer to print the print out based on the arrangement information.

The identifier may be index information for identifying one of the plurality of image data from the rest of the plurality of image data, in a form detected by the image selecting device, and the printer output section may prompt the printer to print the index information with the printed image based on the arrangement information. The index information may be a bar code and the image selecting device is a bar code reader.

The print out may include at least one printed image corresponding to the one of the plurality of image data, the identifier may be a relative position information of the printed image on the print out, the image selecting device detects the relative position information of the printed image by touching the printed image, and the management apparatus may send the one of the plurality of image data to the management folder based on the relative position information detected by the image selecting device.

The image selecting device may be a pressure detecting device which may be associated with the print out and detects the relative position information by detecting pressure against the printed image.

The plurality of image data has attached information which may include information of image capturing attribution of each of the plurality of image data, and the printer output section may arrange the plurality of image data based on the attached information when the printer output section prompts the printer to print the print out.

The management apparatus may include an image group setting section for setting up an image group in the plurality of image data based on a predetermined group setting condition, when one image data included in the image group may be selected by the image selecting device, the image group setting section may send to the management folder substantially all the image data included in the image group. The predetermined group setting condition may be set based on the attached information. The predetermined group setting condition may be set based on the arrangement information.

The identifier may include a destination identifier for indicating the management folder which may be a destination of the image data, and the management apparatus may send the image data to the management folder indicated by the destination identifier.

The management apparatus may further include a display output section for controlling display of a virtual print out corresponding to the print out, the display output section prompting to modify the virtual print out based on the selection by the image selecting device.

According to the second aspect of the present invention an image sorting method for sorting a plurality of image data may comprise selecting one of the plurality of image data from a print out by detecting an identifier which corresponds to a printed image of the one of the plurality of image data on the print out, and managing the plurality of image data by sending to a management folder the one of the plurality of image data thus selected. The image sorting method may have generating identifiers corresponding to the plurality of image data.

According to the third aspect of the present invention, an image sorting method for sorting a plurality of image data may comprise temporarily printing out the plurality of image data by arranging the plurality of image data on a first print out; temporarily selecting a part of the plurality of image data by detecting an identifier, which corresponds to a printed image representing the part of the plurality of image data, using the first print out on which the printed image is printed in a form that the correspondence to the identifier is detected; temporarily sorting the plurality of image data by sending to a first management folder the part of the plurality of image data temporarily selected; printing out at least one of the part of the plurality of image data sent to the management folder by newly arranging the part of the plurality of image data on a second print out; selecting at least one image from the part of the plurality of image data by detecting a corresponding identifier using the second print out; and sorting the plurality of image data by sending the one image to a second management folder.

According to the fourth aspect of the present invention, a recording medium storing a program for a computer to sort a plurality of image data may comprise an image selecting module which operates the computer to select one of the plurality of image data by detecting an identifier, which corresponds to a printed image of the one of the plurality of image data on the print out, and a managing module which operates the computer to sort the plurality of image data by sending to a management folder the one of the plurality of image data thus selected.

According to the fifth aspect of the present invention, an image sorting system for sorting a plurality of image data may comprise a data holding section for holding data of the plurality of image data; an identifier generating section for connecting with the data holding section and generating identifiers corresponding to the plurality of image data; an output unit which connects with the identifier generating section and for outputting a print out of the plurality of image data, the print out having printed images corresponding to the plurality of image data in a form such that the correspondence to the identifiers is detected; an image selecting device for selecting one of the plurality of image data by detecting an identifier corresponding to the printed image of the one of the plurality of image data; and a management processing section which connects with the data holding section for sending the selected one of the plurality of image data to the data holding section based on the identifier corresponding to the printed image which is detected by the image selecting device.

According to the sixth aspect of the present invention, a sheet like member for sorting a plurality of image data may comprise a plurality of identifiers, each of the plurality of identifiers arranged in a predetermined unique position on the sheet like member, the position of each of the plurality of identifiers corresponds to a relative position of one of a plurality of images on a print out on which the plurality of images are printed in a form such that correspondence to the identifiers is detected, the plurality of images represents the plurality of image data, wherein the plurality of image data may be sorted by sending a selected one of the plurality of image data to a management folder; the selected one of the plurality of image data being selected by an image selecting device detecting one of the identifiers corresponding to one of the plurality of image data.

The each identifier may be a bar code and the image selecting device may be a bar code reader. The each identifier may be a relative position on the print out. The image selecting device may be a tablet.

The summary of the invention does not necessarily describe all necessary features of the present invention. The present invention may also be a sub-combination of the features described above. The above and other features and advantages of the present invention will become more apparent from the following description of the embodiments taken in conjunction with the accompanying drawings.

DETAILED DESCRIPTION OF THE INVENTION

The invention will now be described based on the preferred embodiments, which do not intend to limit the scope of the present invention, but exemplify the invention. All of the features and the combinations thereof described in the embodiment are not necessarily essential to the invention.

First Embodiment

In the present embodiment, the system sorts a plurality of image data, which is captured by a digital still camera, for example, using a bar code. Here, the plurality of image data is stored in a data holding device such as a hard disk. The image data is sorted using the management folder provided on the hard disk. The plurality of images is printed with bar codes, each of which is an identifier corresponding to each piece of the plurality of image data. The image data is selected by the bar code reader which selects the printed bar code. Thus, the system sorts the image data without forcing the user to look at a displayed image on the display.

Figure 1:
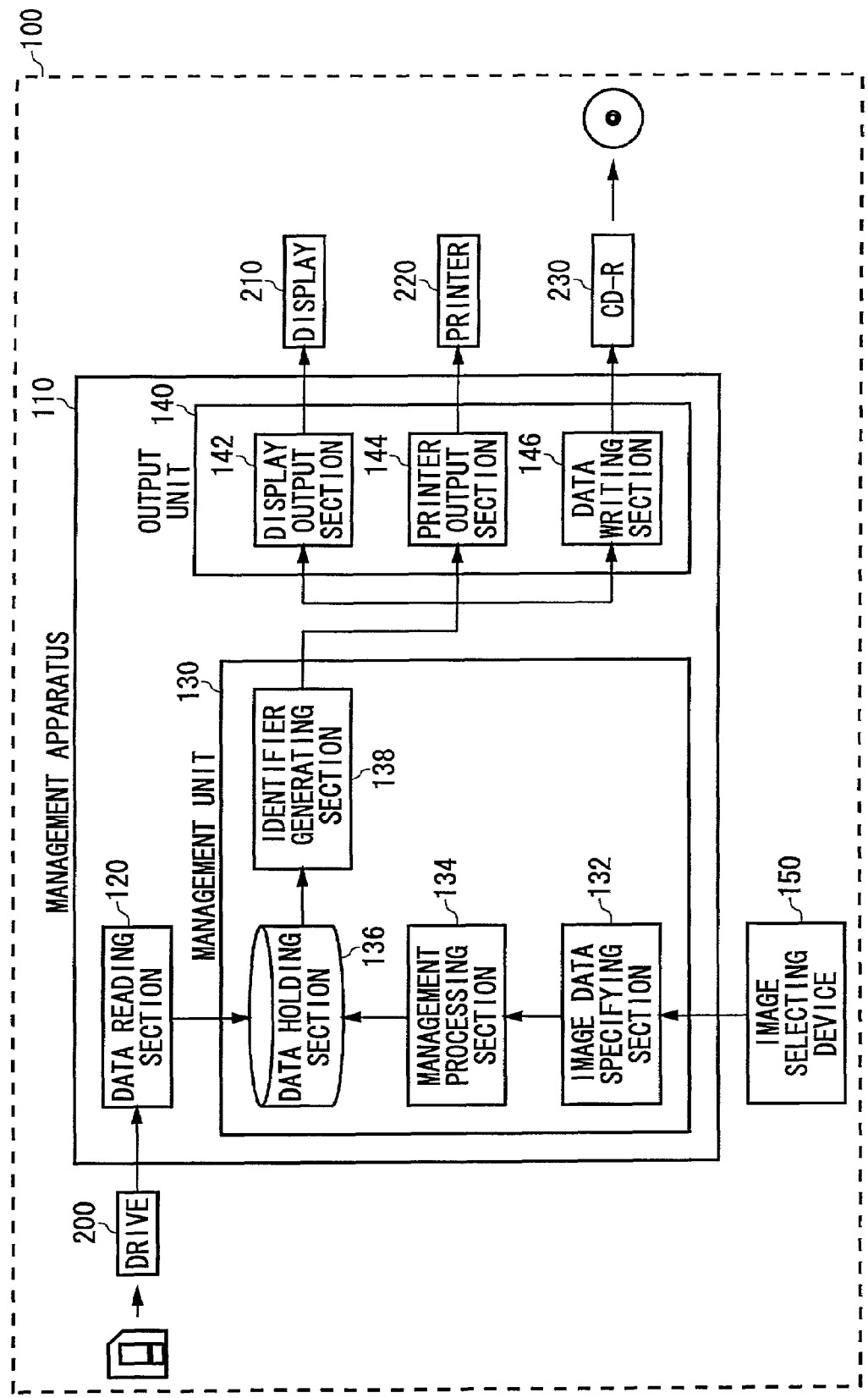
FIG. 1 is a block diagram showing the configuration of an image sorting system according to the first embodiment of the present invention.

FIG. 1 is a block diagram showing the configuration of the image sorting system according to the first embodiment of the present invention. The image sorting system 100 has a management apparatus 110 and an image selecting device 150. The management apparatus 110 manages the plurality of image data using a management folder which is not shown in this figure. A print out which includes the identifier corresponding to each piece of the plurality of image data is outputted by the system. The print out may also include the plurality of image data that is to be selected. The user selects a datum from the plurality of image data by looking at the print out. The image selecting device 150 recognizes the identifier of the plurality of image data so that the image selecting device 150 selects the printed image from the print out of printed images from which the identifier of the plurality of image data can be detected.

The management apparatus 110 may be a computer such as a personal computer, a workstation, and so on. The above described identifier may be index information, which distinguishes an image from the rest of the plurality of images. The index information is detected by the image selecting device 150. The index information may be indicated in the form of a bar code, a letter, a mark and the like. In the present embodiment, the identifier is shown in the form of a bar code. Therefore, the image selecting device 150 in the present embodiment is a bar code reader which reads the bar code that serves as the identifier.

The image sorting system 100 may further have a drive 200, a display 210, a printer 220, and a CD-R drive 230. The drive 200 is for reading image data from a certain recording medium. The recording medium may be, for example, a memory card, CD-ROM, MO, DVD, and the like. The drive 200 may be a CD-ROM drive, an MO drive, and so on.

The display 210 displays the image data stored in the management apparatus. The printer 220 prints the images and the bar codes stored in the management apparatus. The CD-R drive 230 writes the image data stored in the management apparatus 110 into the CD-R.

The management apparatus 110 has a data reading section 120, a management unit 130, and an output unit 140. The data reading section 120 controls the drive 200, and reads the image data from a recording medium. The management unit 130 sends image data appointed by the image selecting device to a management folder, and manages the plurality of image data. The output unit 140 outputs to the display 210 and so on contents which are stored in the management unit 130 such as the image data. The data reading section 120 controls the drive 200 that reads the image data and so on from various kinds of recording medium.

The management unit 130 has an image data specifying section 132, a management processing section 134, a data holding section 136, and the identifier generating section 138.

The data holding section 136 holds or stores the plurality of image data, the management folder, and so on. The data holding section 136 also offers workspace where the image data is sorted. The image data specifying section 132 specifies the image data stored by the data holding section 136 based on the identifier detected by the image selecting device 150. The management processing section 134 creates the management folder in the data holding section 136. The management processing section 134 moves or copies the image data specified by the image data specifying section 132 to the management folder. The identifier generating section 138 generates the bar code as the identifier corresponding with each piece of image data.

The output unit 140 has a printer output section 144, a display output section 142, and a data writing section 146. The printer output section 144 generates arrangement information. The arrangement information is information about how the identifier and the corresponding plurality of images are arranged when the identifier and the corresponding plurality of images are printed on a print out. The printer output section 144 prompts the printer 220 to output the images and the bar codes based on the arrangement information. The printer output section 144 is preferably controlled to prompt the printer to print the bar code alongside the printed image such that the user may look at both the bar code and the printed image at the same time for selection. The display output section 142 prompts the display 210 to display the image data based on the arrangement information which arranges the images with the identifier on the print out. The data writing section 146 prompts the CD-R drive 230 to write into a CD-R the image data stored in the data holding section 136. The image data stored in the data holding section 136 may be written into the CD-R by using a unit of the management folder.

Thus, the management apparatus 110 manages the plurality of image data by sending the image data selected by the image selecting device 150 to the management folder. The user may more conveniently sort the image data with less matching the display. Here, management of the image data performed by the management apparatus includes moving, copying, sorting, and choosing the image data.

Figure 2:
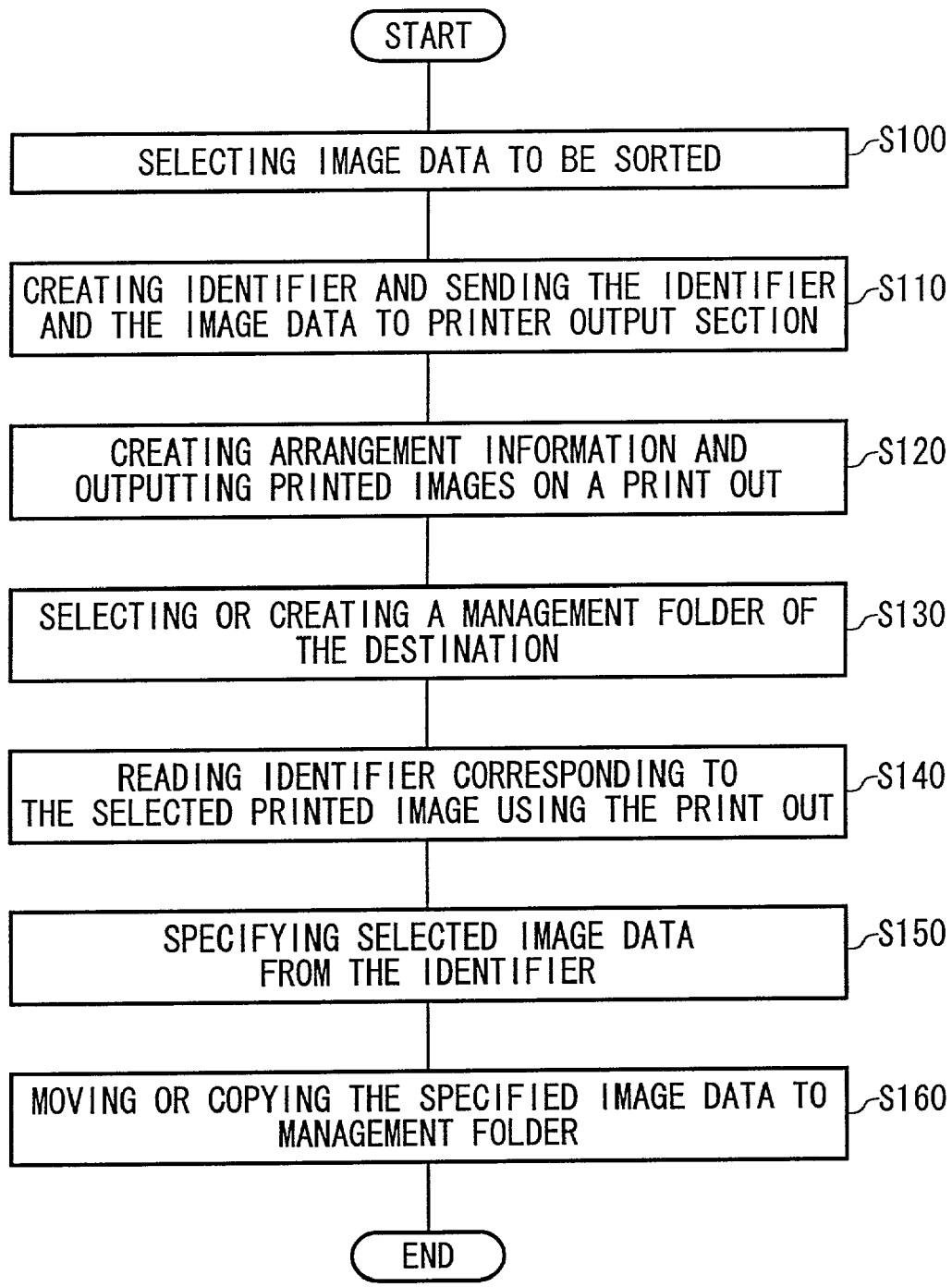
FIG. 2 is a flow chart showing process flow performed by the image sorting system according to the first embodiment of the present invention.

FIG. 2 is a flow chart showing process flow performed by the image sorting system according to the first embodiment of the present invention. The management processing section 134 in the management apparatus 110 selects the image data before sorting (S100). The identifier generating section 138 generates a bar code as the identifier, and sends the image data and the identifier to the printer output section 144 (S110). The printer output section 144 prompts the printer to print the image and the bar code as the identifier on a print out based on the arrangement information (S120). The user sorts the image data using the printed images on the print out.

The management processing section 134 in the management apparatus 110 generates or selects the management folder which is a destination of the image data (S130). The image selecting device 150 detects the bar code as the identifier corresponding to the selected printed image on the print out and converts the identifier to datum (S140). The image data specifying section 132 specifies an image datum based on the datum received from the image selecting device 150 (S150). The management processing section 134 moves or copies the specified image datum to the management folder selected by the management processing section 134 (S160).

As described above, the printed image and the bar code corresponding with the printed image is printed on the print out. Thus, the user is no longer required to look at and identify images on the display for sending desired image data to the management folder.

Figure 3:
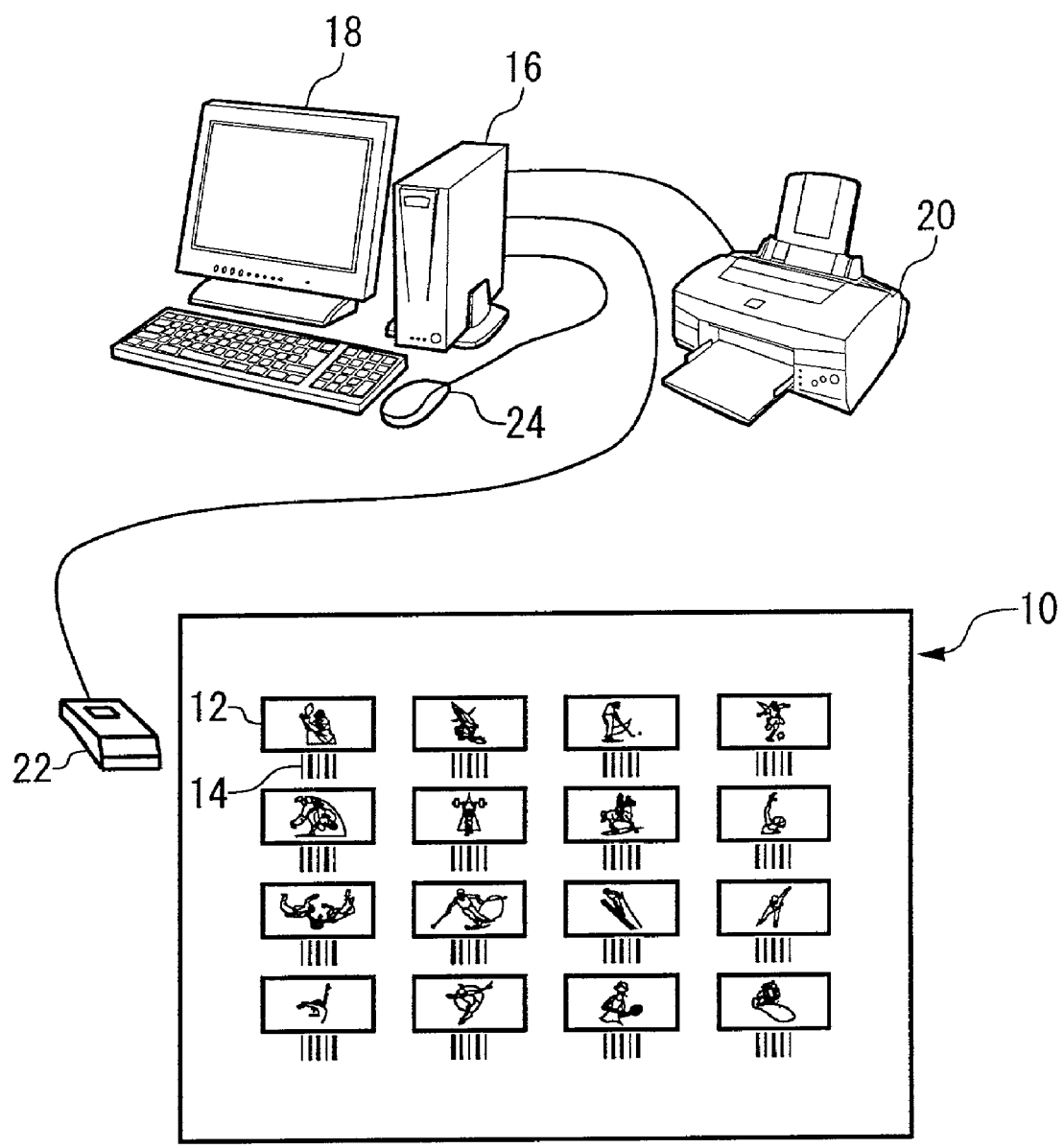
FIG. 3 shows the construction of the image sorting system according to the first embodiment of the present invention.

FIG. 3 shows the construction of the image sorting system according to the first embodiment of the present invention. The image sorting system has a management apparatus 16, an image selecting device 22, a printer 20, a display 18, and a mouse 24. The management apparatus 16 in the present embodiment is a computer and the image selecting device in the present embodiment is a bar code reader.

Printed images 12 corresponding to the image data stored by the management apparatus 16 are printed on the print out 10. Bar codes 14 as the identifiers are printed alongside the printed images 12.

Next, the process for sorting a plurality of image data will be described. The printer output section 144 prompts the printer to print the images and the bar codes based on the arrangement information. The user selects a destination management folder displayed on the display 18 of the computer using the mouse 24.

The user selects the bar code 14 corresponding with one of the printed images to be selected which is printed on the print out 10 using a bar code reader 22 as the image selecting device. An image datum specified by the selected bar code is sent to the destination management folder. If the user wants to narrow the number of images and sort the image data sent to the management folder again, the printer 20 is prompted to print another print out 10.

As described above, by selecting the bar code 14 on the print out 10, the image data may be sorted into each of the desired management folders. The bar code reader, popular in the POS system applied for merchandisers, is easy to use. The bar code system has high recognition accuracy, so that a large amount of images may be quickly selected. Here, the number and the arrangement of the images printed on a print out is preferably varied depending on the size of the paper used for the print out, outputting resolution of the printer, and so on.

Figure 4:
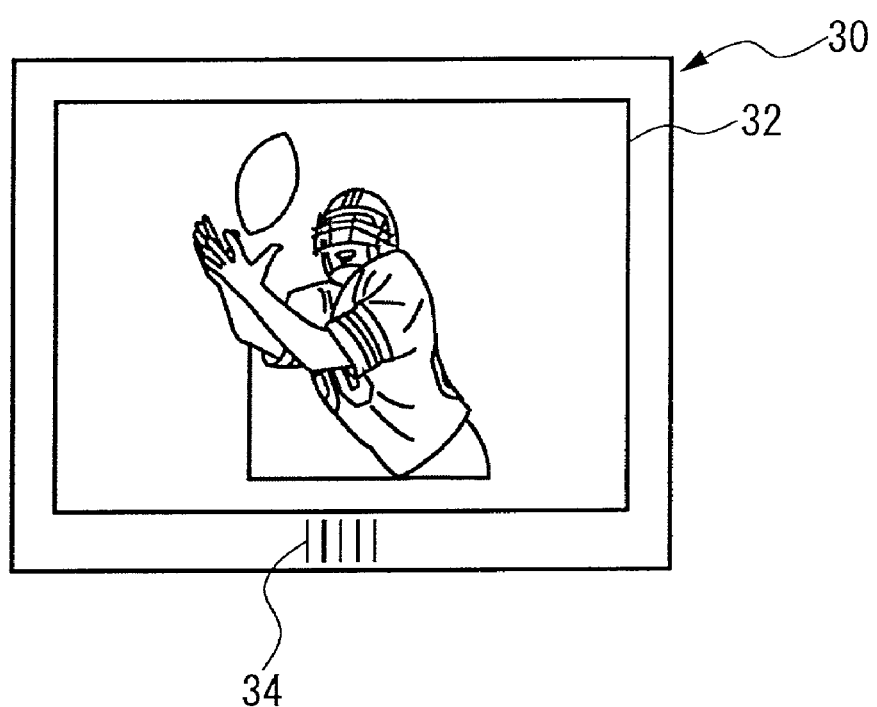
FIG. 4 shows an example of a print out according to the first embodiment of the present invention.

FIG. 4 shows an example of a print out according to the first embodiment of the present invention. A printed image 32 is printed on a print out 30. A bar code 34 which identifies the printed image 32 from the rest of the image data is printed alongside the printed image 32. The user selects the image data by selecting the bar code 34 corresponding with the printed image 32. Thus, printing the bar code alongside the printed image emphasizes how the printed image and the bar code correspond with each other.

Figure 9:
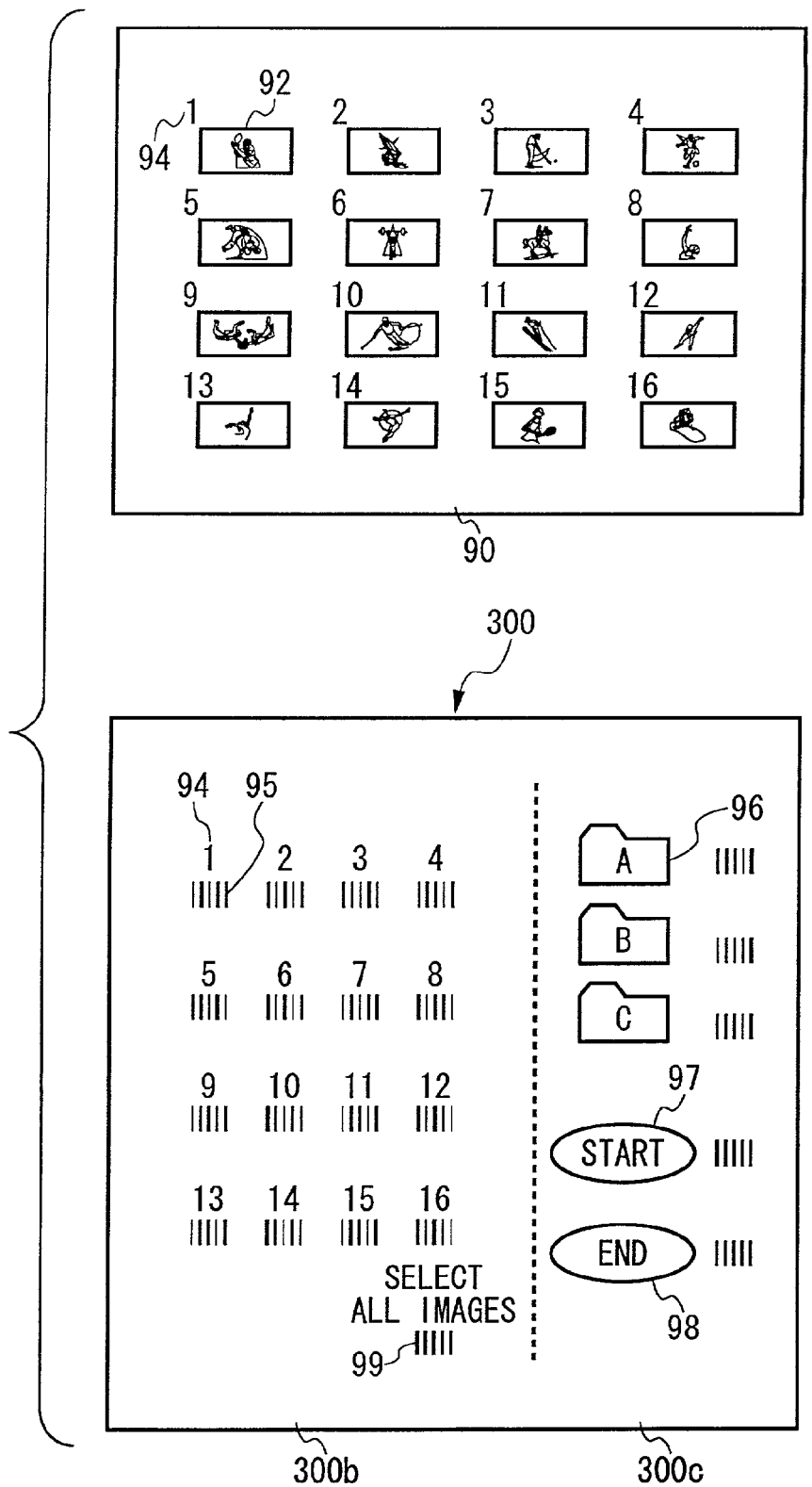
FIG. 9 is another style of a print out and a sheet like member applied in the first embodiment of the present invention.

In FIG. 4, one printed image 32 is printed on the print out 30. When a plurality of images is printed on the print out, the images are arranged in a grid pattern such that the user may easily select the printed images. This grid arrangement is based on the arrangement information. In particular, when a desired image is selected from the plurality of printed images, each of the bar codes is preferably provided alongside the corresponding printed image so that selection errors are reduced. The identifier 34 is provided on the print out on which the printed image 32 is printed, however, this is not always necessary. For example, the identifier 34 is printed separately on paper from the print out on which the printed image 32 is printed, and the identifier is attached to the print out on which the printed image 32 is printed. As another example, as shown in FIG. 9 which is described later, a sheet like member, on which a certain number of the identifiers are printed and arranged in the grid pattern, is provided; and a print out, on which the same certain number of images are arranged in the corresponding grid pattern, is printed out.

Figure 5:
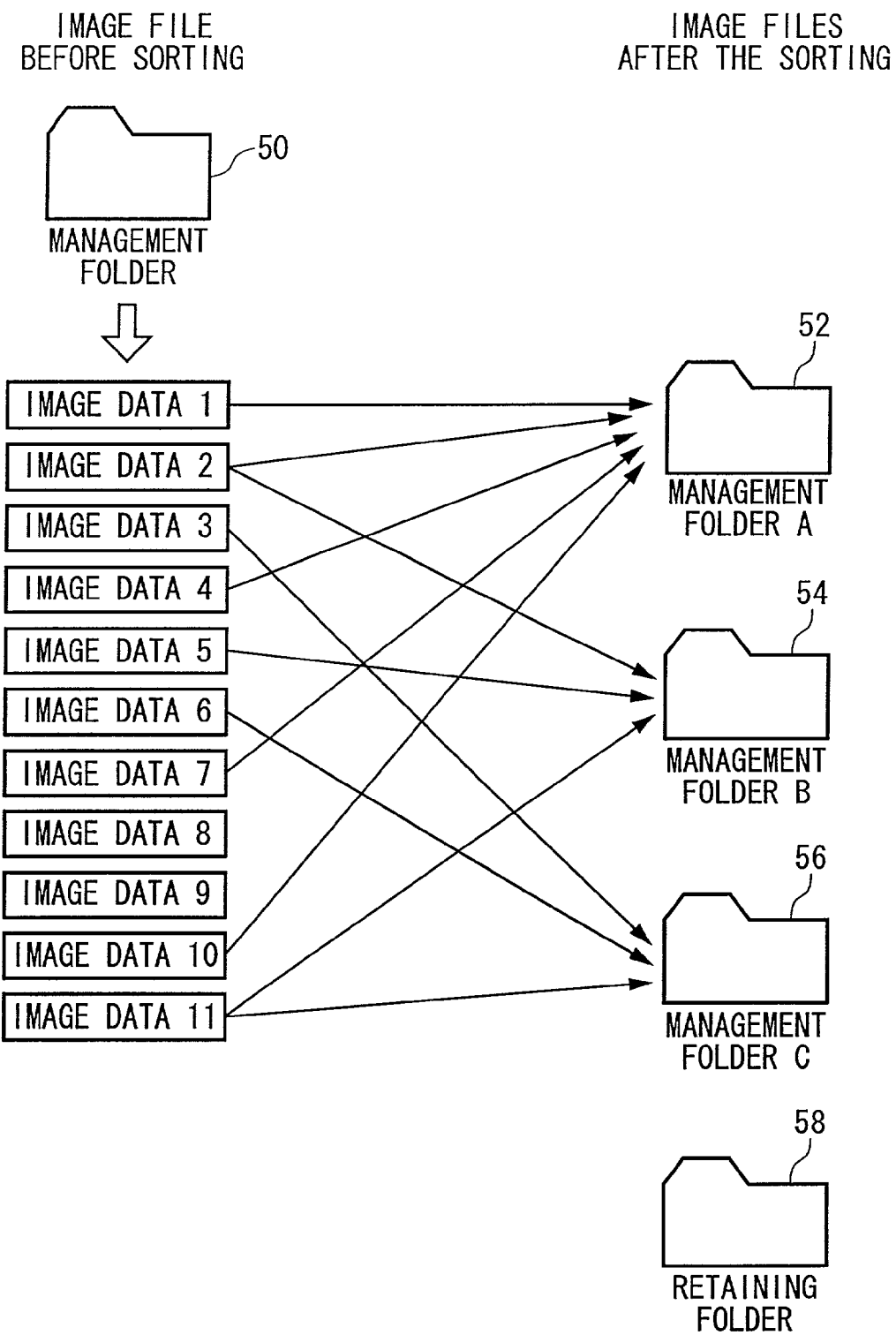
FIG. 5 is an explanatory figure showing the configuration for sorting the image data by using a management folder according to the first embodiment of the present invention.

FIG. 5 is an explanatory figure showing the configuration for sorting the image data using the management folder according to the first embodiment of the present invention. The management apparatus 110 manages the plurality of image data using management folders. Here, management folders 50, 52, 54, and 56 are stored in the data holding section 136 based on an instruction from the management processing section 134 in the management apparatus 110. The management folder 50 stores and manages a plurality of image data from 1 through 11 before sorting. On the other hand, the management folder A 52, the management folder B 54, and the management folder C 56 are destination management folders where the image data from 1 through 11 are sent.

The image data 1, 2, 4, 7, and 10 managed by the management folder 50 are sent into the destination management folder A 52. In the same way, the image data 2, 5, and 11 are sent or copied into the management folder B 54. The image data 3, 6, and 11 are sent into the management folder C 56. The image data 8 and 9, neither of which is selected here, may be continuously managed by the management folder 50. The image data 8 and 9 may be sent to a retaining folder 58 because in such a case the image data is re-sorted.

In this case, three of the destination management folders are provided, but the number of the destination management folders is not limited to three. In some cases, before sorting, the image data is not limited to be stored in the management folder. As another example, before sorting, a plurality of the management folders for the image data may be provided and the image data, before sorting, may be stored by the plurality of management folders.

The management folders and the image data are not limited to be accommodated in the same management apparatus. For example, the present system is applied to a digital camera which uses a memory card for recording, the camera is connected to a computer, and a management folder is provided on a hard disk in the computer. In such a case, the image data stored in the memory card may be sent or copied to the hard disk of the computer. Here, the image data before sorting is not necessarily managed by a management folder.

As another example, the system copies every image datum before sorting that is stored in the management folder 50 and pastes into the destination management folders 52, 54, and 56. In this case, the management folder 50 manages the image data before sorting, even after sorting has been completed. Therefore, even when the user failed to sort the image data, the user may re-sort the same data.

Figure 6:
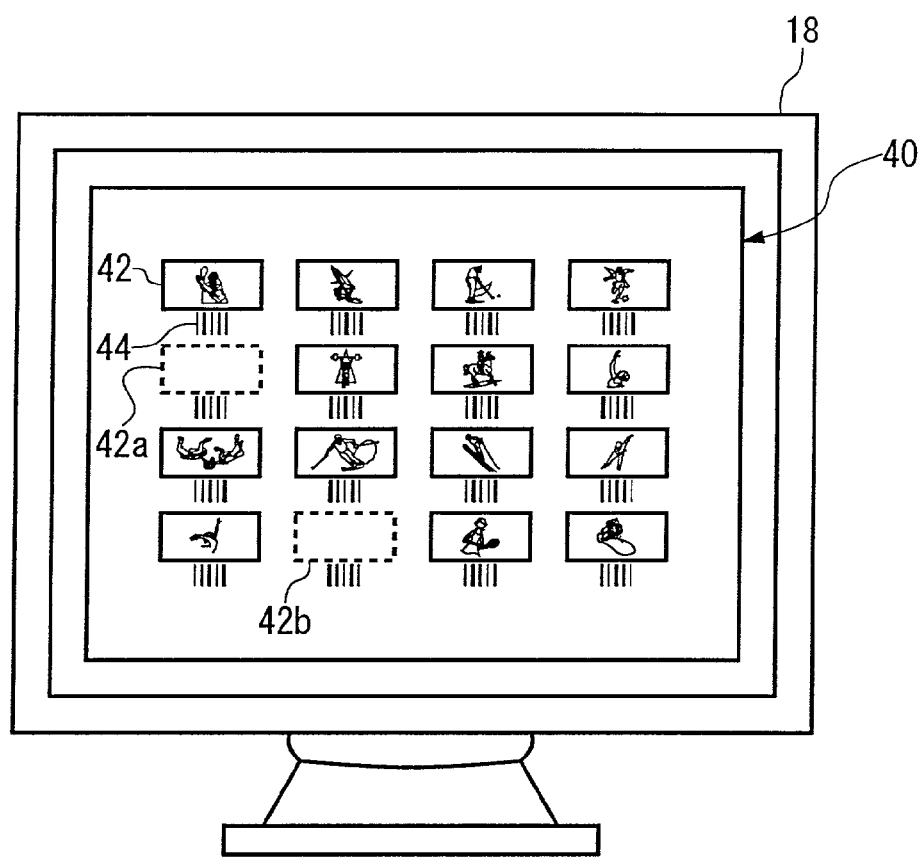
FIG. 6 shows an example of a print out and a corresponding virtual print out according to the first embodiment of the present invention.
Figure 6:
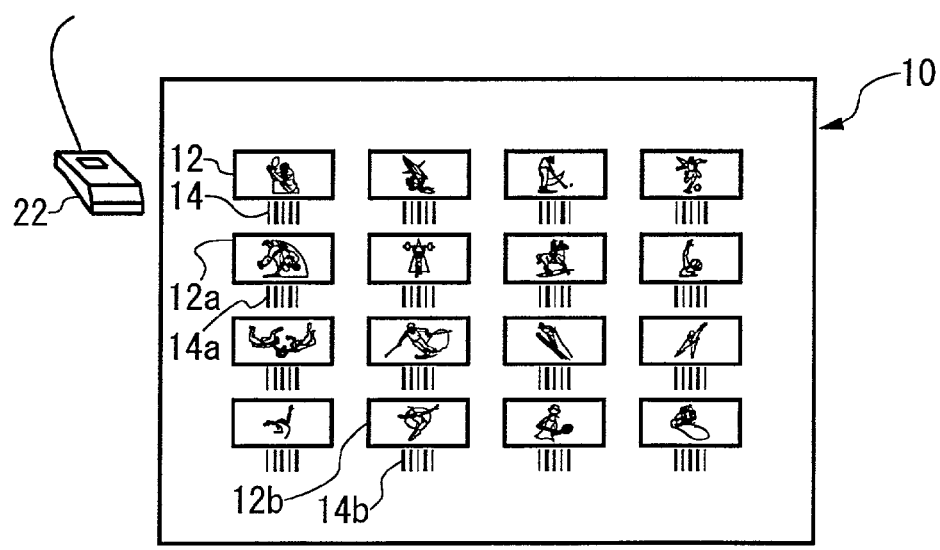

FIG. 6 shows an example of a print out and a corresponding virtual print out according to the first embodiment of the present invention. Here, the printed images 12 and the bar codes 14 which are the identifiers corresponding to each of the printed images 12 are arranged in the grid pattern and printed on the print out 10. The virtual print out 40 corresponding to the print out 10 is displayed on the display 18. Virtual printed images 42 and the bar codes 44 as the identifiers, both of which correspond to the printed images 12 on the print out 10, are arranged and displayed on the virtual print out 40.

Next, correspondence between the print out 10 and the virtual print out 40 displayed on the display 18 will be described. Each of the printed images 12 on the print out 10 corresponds with the virtual images 42 on the virtual print out 40. Similarly, each of the bar codes 14 on the print out 10 corresponds with the bar codes 44 on the virtual print out 40. To send the selected image datum to the appointed management folder, the bar code 14 alongside the printed image 12 is selected by the bar code reader 22. Here, for example, the bar codes 14a and 14b corresponding with the printed images 12a and 12b on the print out 10 are selected. On the virtual print out 40, the virtual printed images 42a and 42b corresponding with the printed images 12a and 12b on the print out 10 are disappeared. That is, the virtual printed image display is changed corresponding to the printed image selected on the print out 10. Applying the virtual print out, the progress of selection for images on the print out 10 is visibly recognized. Further, which image on the print out is selected is visibly checked so that duplicate selection of an image may be avoided.

The change on the display may be noticeably marking or blinking the virtual printed image 40 on the display 18. For another form of the present embodiment, when an image is to be selected twice or more, the management apparatus may beep an alarm or control such that the image cannot be selected.

Figure 7:
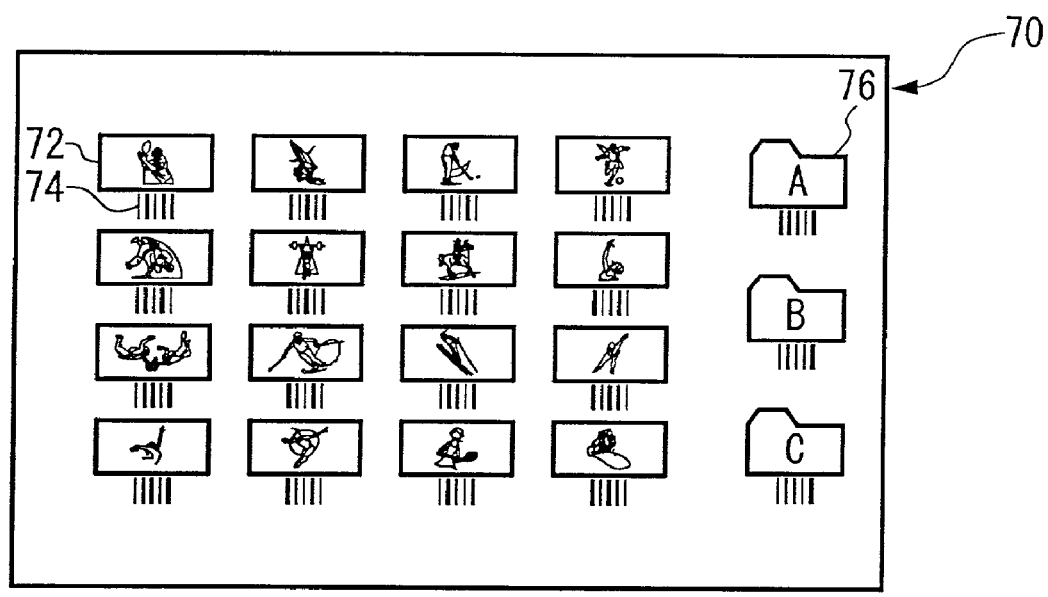
FIG. 7 shows another example of a print out applied in the first embodiment of the present invention.

FIG. 7 shows another example of the print out applied in the first embodiment of the present invention. A plurality of printed images 72 corresponding to each piece of the plurality of image data is printed on the print out 70. The bar codes 74 as the identifier corresponding to the printed images 72 are printed alongside each of the printed images 72. Further, destination identifiers 76 corresponding with the plurality of destination management folders for the image data are printed on the right side of the print out 70. Each of the destination identifiers 76 is accompanied with a symbol in a folder form which represents the destination management folder. When the identifier 76 is selected by the image selecting device, the image data is sent to the corresponding management folder specified by the destination identifier 76.

As described above, when the destination identifier 76 is also appointed on the print out, the workload on the display may be reduced. Thus, selection of the image data is performed intensively and effectively on the print out. Applying the destination identifier 76, the user only uses the bar code reader and appoints the bar code on the print out, so that even the user not familiar with a computer and a mouse may sorts the image data effectively without problems.

Figure 8:
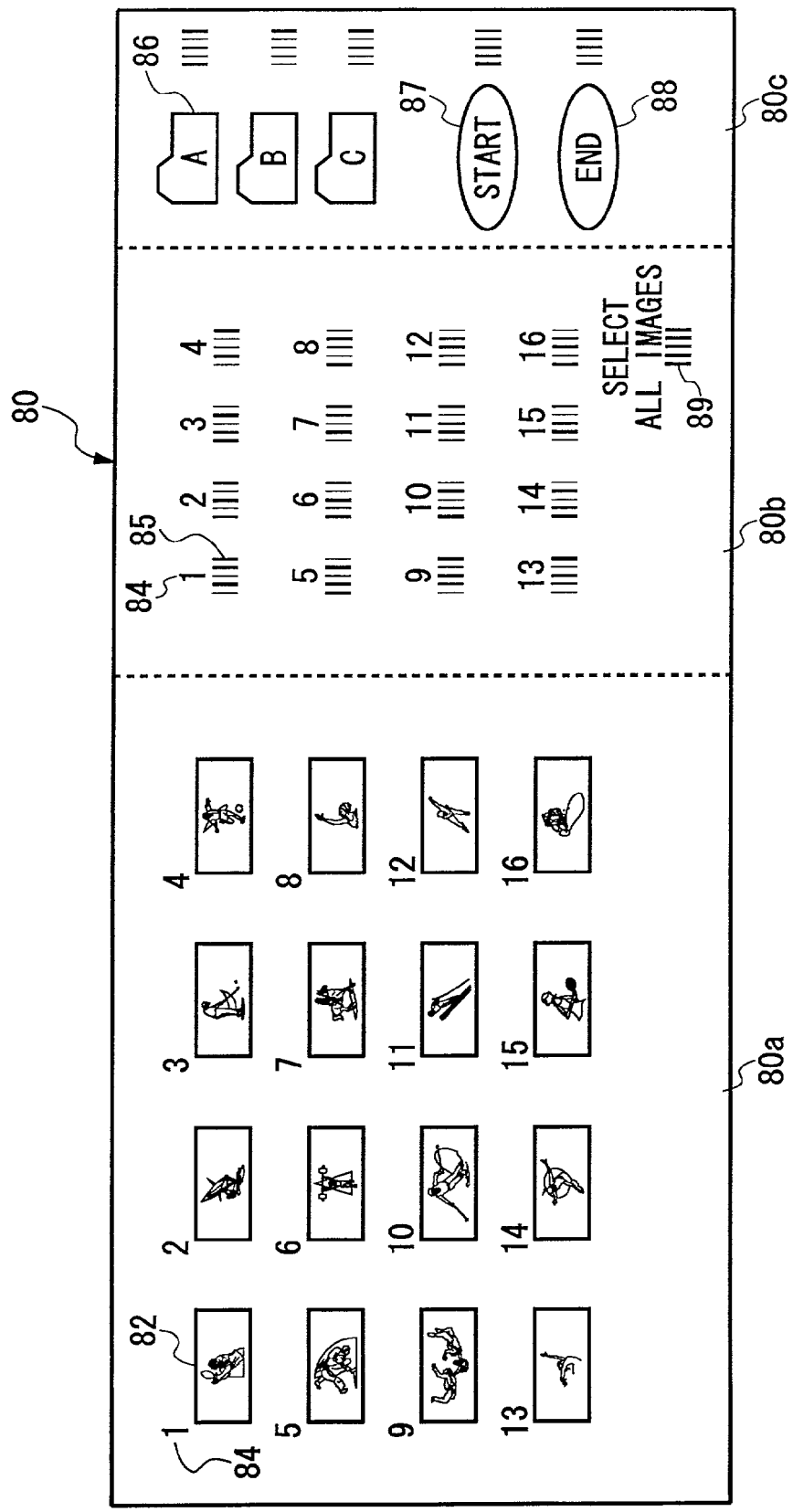
FIG. 8 shows further example of a print out applied in the first embodiment of the present invention.

FIG. 8 shows further example of the print out applied in the first embodiment of the present invention. The print out 80 includes regions 80a, 80b, and 80c. A plurality of printed images 82 corresponding with the plurality of image data are arranged in the grid pattern in the region 80a. A number 84 is printed alongside each of the printed images 82. The number is the index information corresponding with the printed image 82 on the print out. In the region 80b, the number 84 corresponding with the printed images 82 and the bar code 85 corresponding with the numbers are arranged in the grid pattern and printed as the index information. In the region 80c, the destination identifiers 86, starting identifier 87, and ending identifier 88 are printed. The destination identifiers 86 are the bar codes indicating the management folders for the destination. The start identifier 87 is a bar code which prompts the management apparatus to start the image selection. The ending identifier 88 is a bar code which prompts the management apparatus to finish the image selection. Furthermore, an all selecting identifier 89 may be provided in the region 80b. The all selecting identifier 89 is a bar code which prompts to select all the images printed on the print out at once.

FIG. 9 is another style of a print out and a sheet like member applied in the first embodiment of the present invention. The information is printed in almost the same arrangement as FIG. 8. That is the printed information includes a plurality of printed images 92 in the printout 90 and a number 94 printed alongside each of the printed images 92 on the printout 90. However, the identifiers which are printed in the region 300b and 300c, are printed on a separate sheet like member 300. Also, the number 94 corresponding with the printed images 92 and identifiers 95 corresponding with the numbers are printed in the region 300b and the destination folders 96, the starting identifier 97 and the ending identifier 98 are printed in the region 300c. The sheet like member 300 may be printed on paper and printed every time the selection is made. The sheet like member 300 may also be made of a plastic sheet that the identifiers 95 have been previously printed on. The images before sorting are printed on the print out 90 each time, and the user selects the printed images printed on the most resent print out 90. The user appoints the relative position of a certain printed image 92 by prompting the image selecting device to detect the bar code 95 which is arranged in a corresponding relative position on the sheet like member 300 facing at the print out 90. When the sheet like member 300 is printed previously, the number and the arrangement of the printed images 92 on the print out 90 are fixed.

As described above, when the various kinds of bar codes are printed on the same print out, the workload using the display is reduced. Therefore, the selecting and sending the image data is performed intensively and effectively on the print out. The user looks at the images printed on paper, not images displayed on a CRT; therefore eyestrain of the user may be avoided.

Second Embodiment

The present embodiment is a modification of the image sorting system according to the first embodiment shown in FIG. 1. The image data captured by a digital camera often has attached information such as the data of image-capturing condition. When a large amount of image data is sorted, it is preferable that the image data is formed into groups based on the attached information such that the image data is sorted effectively. The second embodiment differs from the first embodiment in the point that a plurality of image data is managed using the unit of the image group.

Figure 10:
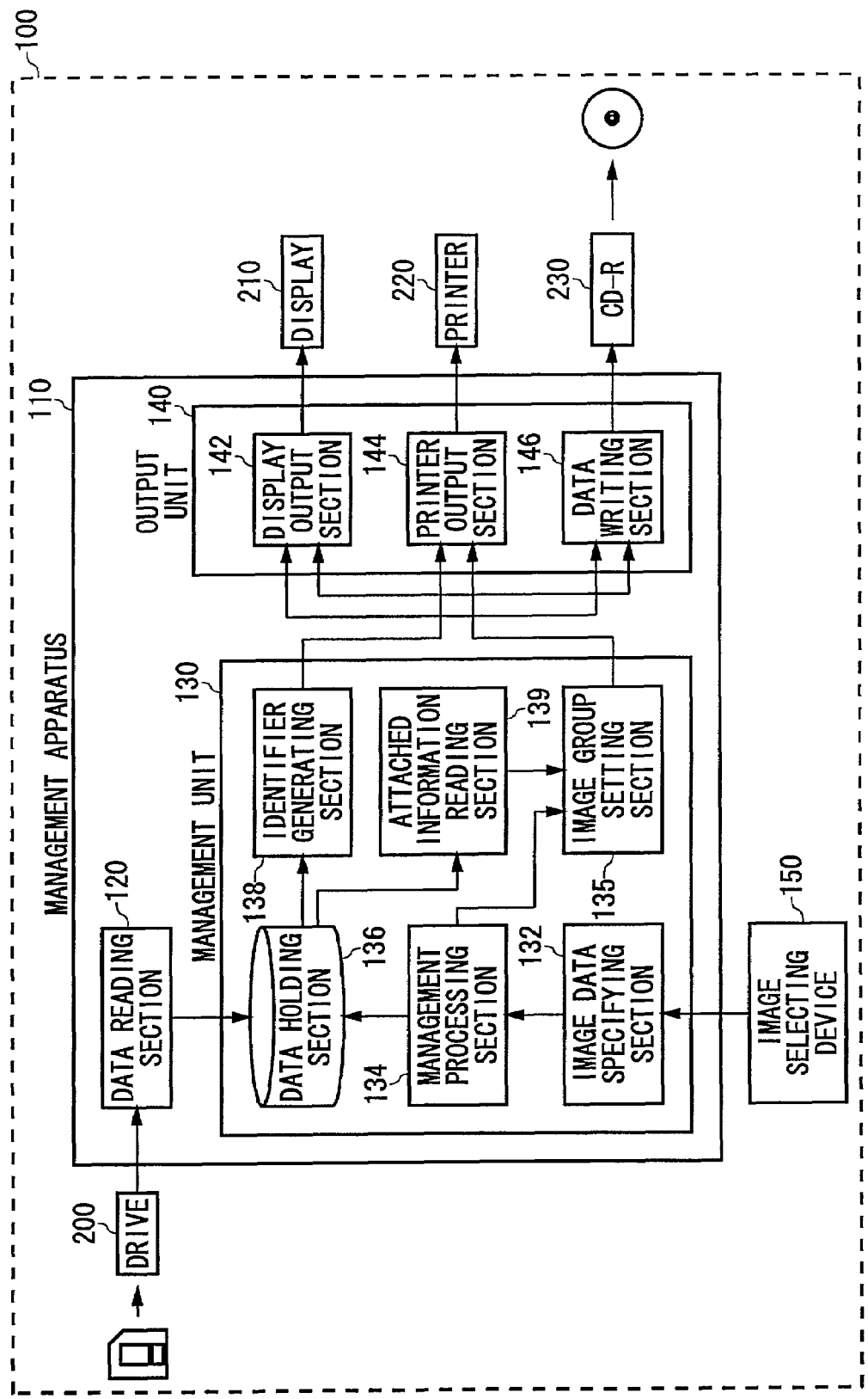
FIG. 10 shows a block diagram of an image sorting system according to the second embodiment of the present invention.

FIG. 10 shows a block diagram of the image sorting system according to the second embodiment of the present invention. First, the configuration of the image sorting system 100 will be described. The image sorting system 100 has an attached information reading section 139 and an image group setting section 135 in the management unit 130, and the rest of the configuration of the image sorting system 100 is the same as FIG. 1 of the first embodiment. The management unit 130 further has the attached information reading section 139 and the image group setting section 135. The attached information reading section 139 reads attached information attached to the image data stored in the data holding section 136. The attached information may be variant information, and the attached information may include the capturing condition of image data and so on. For example, the attached information may be the date and time of capturing, the place the image is captured, the weather at image capturing, the brightness of the image, and so on.

The image group setting section 135 sets up an image group from the plurality of image data based on a predetermined group setting condition. The image group setting section 135 sends, when one of the image data representing the image group is selected by the image selecting device, all the image data included in the image group to the same management folder.

The predetermined group setting condition may be set up based on the above described attached information. The predetermined group setting condition may also be set based on the arrangement information created by the management processing section 134. The arrangement information is, for example, information that the printed images are arranged on the print out for 5 columns and 5 rows. The image group may be set, for example, for each of the columns based on the arrangement information.

The image group setting section 135 sends the information about the image group set at the image group setting section 135 to the output unit 140. For example, the printer output section 144 may prompt the printer to print the print out on which each of the image groups is printed based on image group information received from the image group setting section 135. In other case, the printer output section 144 may prompt the printer to print the arranged image data based on the attached information without setting the image group.

When the group setting is applied on the image data as described above and one of the images representing the image group is selected on the print out, the plurality of images set in the image group is selected and sent to the management folder as a unit. The group setting is preferable when sorting a large amount of image data based on some attribution.

Figure 11:
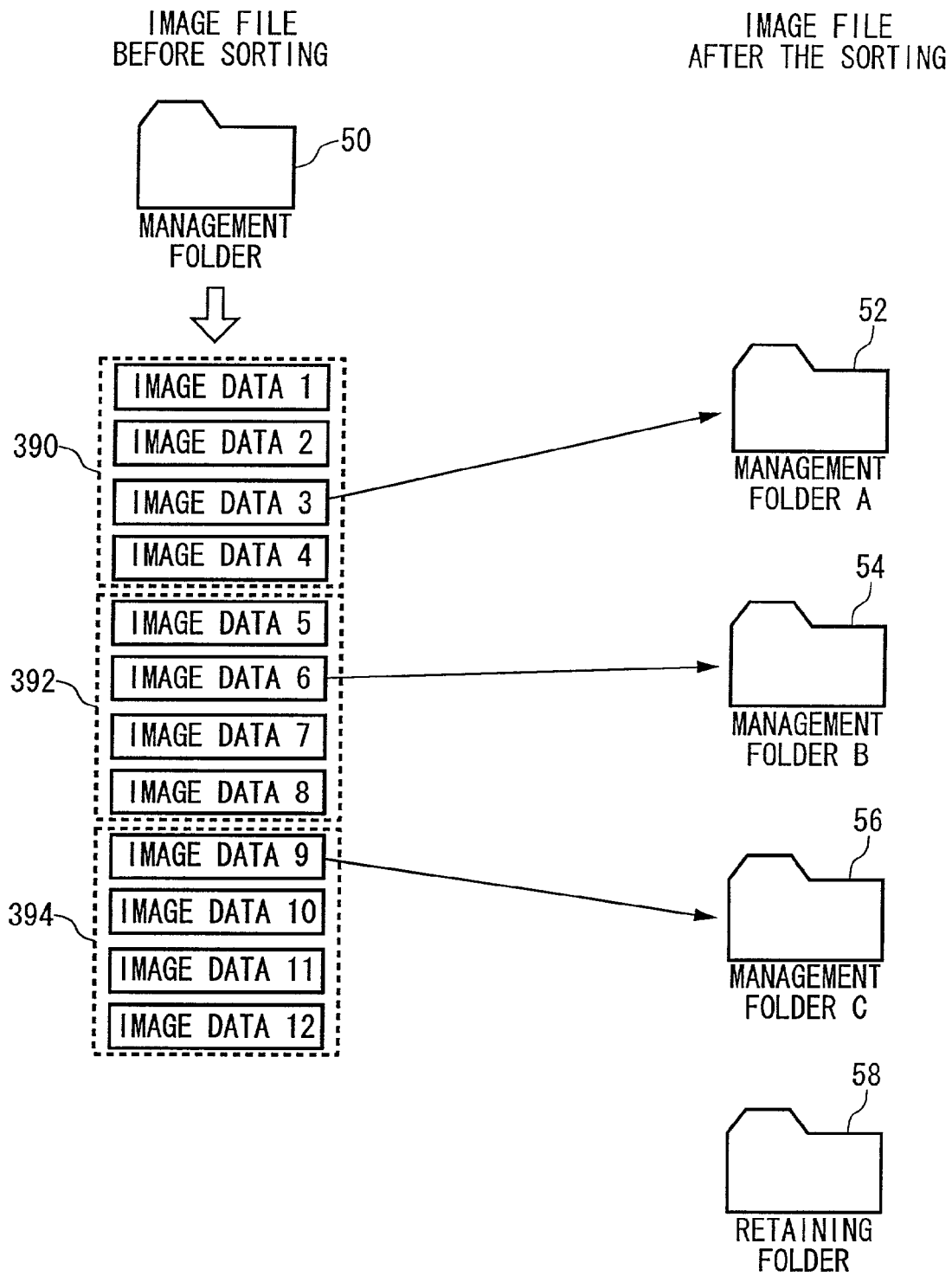
FIG. 11 is an explanatory figure showing the configuration of image data sorting by using the management folder according to the second embodiment of the present invention.

FIG. 11 is an explanatory figure showing the configuration of image data sorting using the management folder according to the second embodiment of the present invention. The management apparatus 110 manages the plurality of image data using management folders. For example, the management folders 50, 52, 54, and 56 are stored in the data holding section 136 based on an instruction from the management processing section 134 in the management apparatus 110. The management folder 50 stores and manages a plurality of image data from 1 through 12 before sorting. On the other hand, the management folders 52, 54, and 56 are destination management folders which are appointed for the destination of the image data from 1 through 12. Furthermore, the image data from 1 through 12 has the attached information including the capturing condition of each piece of image data. The attached information is, for example, the information about the date and time, place, and brightness at the image capturing of each piece of image data. In FIG. 11, the image data from 1 through 12 before sorting is, for example, divided in three image groups 390, 392, and 394 based on the time of capturing.

Next, an example of the method for sorting the image data using the image group will be described. When one of the image data representing the image group is selected and sent to a certain management folder, the rest of the image data included in the image group is also selected and sent to the same management folder. Here, the image data 3 representing the image group 392 is selected to be sent to the management folder A 52. Applying the present selection, the rest of the image data 1, 2, and 4 included in the image group 392 is also selected and sent to the management folder A 52.

In other form of the embodiment, the image group may be set based on the arrangement information. For example, the arrangement information is information that the printed images are arranged in 4 rows and 3 columns. The image data from 1 through 4 is arranged in the first column. Similarly, the image data from 5 through 8 is arranged in the second column; and the image data from 9 through 12 is arranged in the third column. Here, three image groups are set up based on this arrangement information, that is, an image group is set up for each column on the print out. When a printed image representing one of the columns is selected, all the image data corresponding to the printed images in the column is also selected and sent to the same management folder. As another example, for example, the image group may be set up such that a selected image and the surrounding 8 images are set in the group and sent to the same management folder when the image is selected.

As described above, by sending a plurality of image data bundled into groups based on the attached information or the arrangement information, a large amount of image data may be sorted effectively and rapidly. The grouping is especially preferable when a large amount of image data is roughly sorted step by step.

The image data included in an image group is not limited to the images printed on the same print out. The image data included in an image group is not limited to the image data included in an image group. An image group may be set across a plurality of management folders. That is, the image data before sorting or after sorting which is set into a certain image group is not restricted by the management folders set before sorting. In some cases, the image group based on the attached information and the image group based on the arrangement information may be mixed. In other cases, one image may be included in a plurality of image groups.

All the image data included in the image group is not always printed on the print out when the representing image is selected. Therefore, in some cases, the management apparatus controls the image data such that the image data not printed, even included in the same image group, is not selected and moved. In other case, on the contrary, when one of the image data representing the image group is selected, even a part of the images included in the image group is not printed yet, the management apparatus may control all the image data included in the image group is selected and moved.

Figure 12:
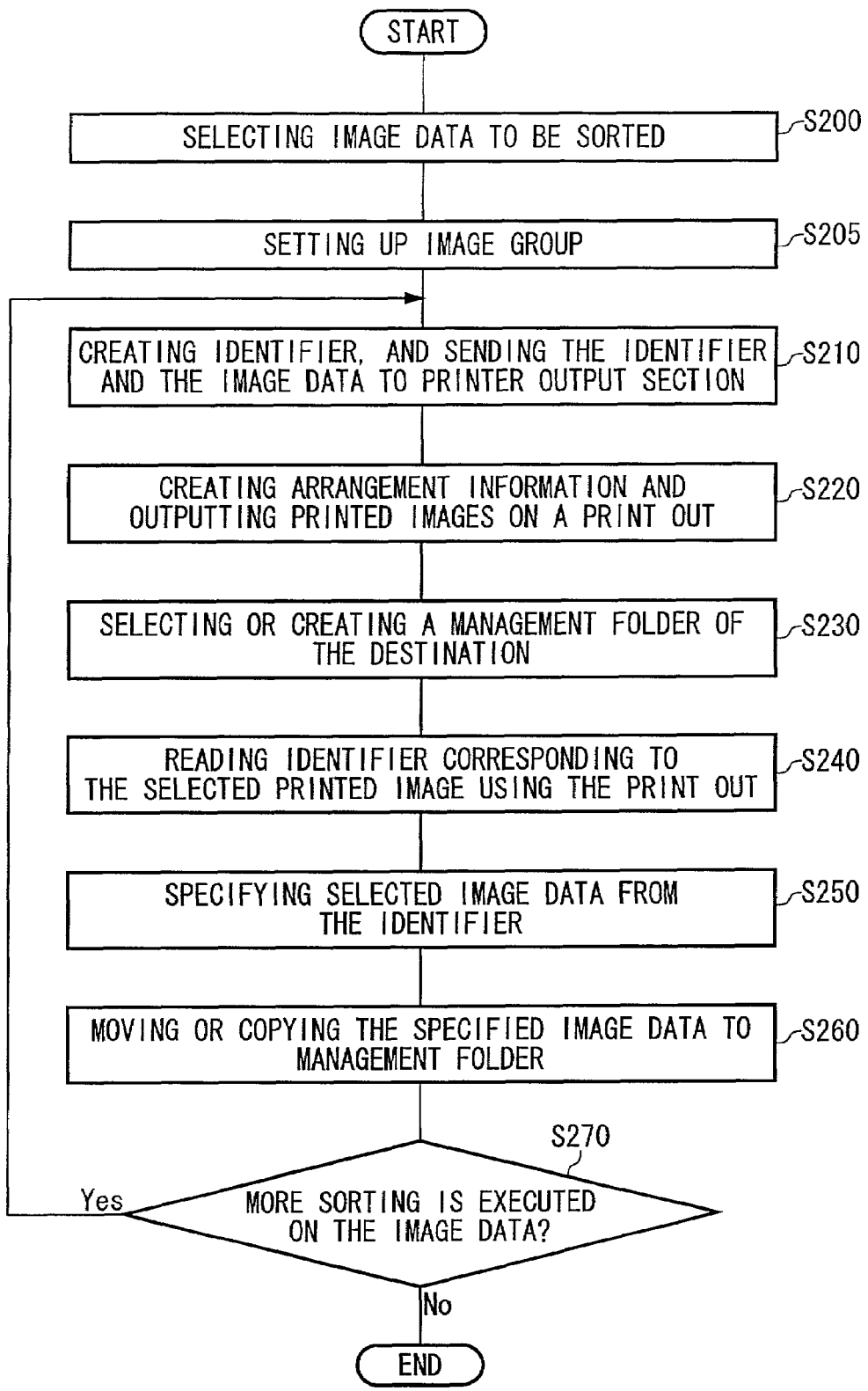
FIG. 12 is a flow chart showing processes performed by the image sorting system according to the second embodiment of the present invention.

FIG. 12 is a flow chart showing processes performed by the image sorting system according to the second embodiment of the present invention. The processing performed by the second embodiment is in particular preferable to sort a large amount of image data step by step. The management processing section 134 provided in the management apparatus 110 selects the image data before sorting (S200). The image group setting section 135 sets up the image group based on the attached information of the image data before sorting (S205). The identifier generating section 138 generates the bar code as the identifier for an image data representing the image group, and sends the image data representing the image group and the identifier to the printer output section 144 (S210). The printer output section 144 prompts the printer to print the image and the bar code based on the arrangement information (S220). The user sorts the image data using the print out from the printer.

The management processing section 134 provided in the management apparatus 110 selects or creates the management folder which is the destination of the image data (S230). The image selecting device 150 recognizes the bar code corresponding to the selected printed image which is selected from the bar codes corresponded with the printed images on the print out (S240). The image data specifying section 132 specifies the image datum based on the information received from the image selecting device 150 (S250). The management processing section 134 sends or copies the specified image datum and the image data included in the same image group to the selected management folder (S260).

When a large amount of image data is sorted step by step, the above described processes for the first time is a temporary sorting. If another sorting for the image data is required, the system goes back to the step 210 (S270), and prompts the printer to print another new print out. Using the new print out, the system may repeat the same sorting process for the image data.

As described above, sorting the image data step by step enables the convenient processing of a large amount of image data with the temporary grouping. Therefore, the user may, without looking at the display, send desired image data to a chosen management folder. The selection on the display is harder than on a printed photograph using a film because the visibility and the resolution of a digital image displayed on the display is inferior to the visibility and the resolution of the printed photograph using a film. Applying the step-by-step sorting on the image data using a print out, a large amount of image data is sorted as easy as the photographs.

Third Embodiment

The third embodiment of the present invention differs from the first embodiment where a tablet is used instead of the bar code reader for selecting the printed image on the print out when the image data is sorted. The identifier of the present embodiment is relative position information of the printed images on the print out. The relative position information is detected by touching the printed image using the image selecting device. The management apparatus 110 sends the selected image data to the management folder based on the relative position information detected by the image selecting device.

The tablet is a pressure detecting apparatus which detects pressure applied on the selected printed image and recognizes the relative position information of the selected image on the print out. The tablet includes a board like member. A plurality of pressure detecting sensors is provided on an upper surface of the board like member. The print out is set on the predetermined position of the upper surface. When one of the printed images on the print out is touched, the pressure sensor detects the pressure, and the relative position where the pressure is applied is recognized. Thus, based on the relative position of the printed image on the print out, and the image data corresponding with the printed image is specified.

Figure 13:
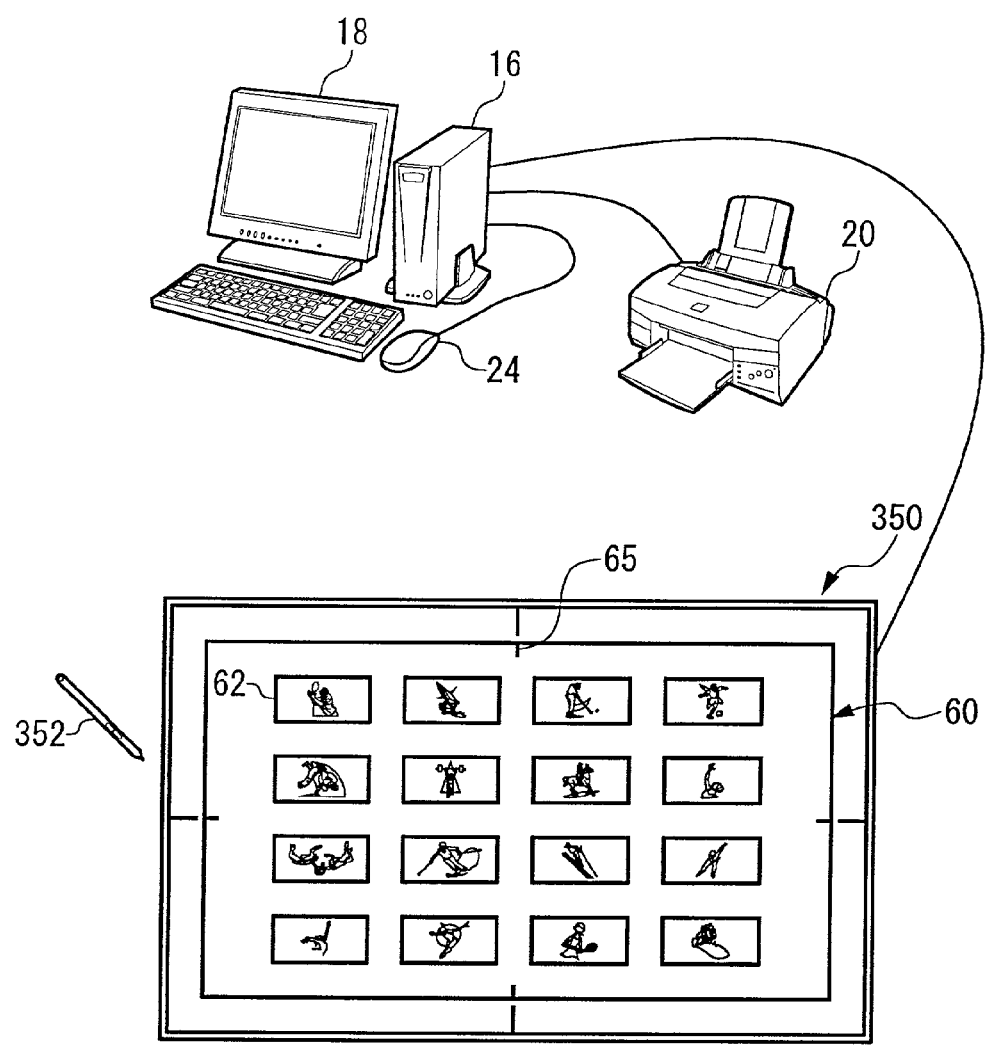
FIG. 13 shows the configuration of an image sorting system applying the third embodiment of the present invention.

FIG. 13 shows the configuration of the image sorting system applying the third embodiment of the present invention. The configuration of the image sorting system is the same as the first embodiment shown in FIG. 3 except comprising the tablet 350 and an appointing device 352 instead of the bar code reader. The processing of sorting image data is also the same as the first embodiment except the appointing method for the selected image uses the tablet 350 and the appointing device 352.

A plurality of printed images 62 is printed on the print out 60. Each of the plurality of images corresponds to one of the image data stored in the management apparatus 16. The tablet 350 is provided in a predetermined position under the print out 60. Each of the printed images 62 on the print out 60 has the relative position information on the print out 60 as the identifier. The relative position information is set up based on the arrangement information created by the management processing section 134 of the management apparatus 110. Therefore, when one of the printed images 62 to be selected is touched by the appointing device 352, the tablet 350 recognizes the relative position information of the selected printed image 62 and the system identifies the image data corresponding with the selected printed image.

Here, the tablet 350 is chosen for the image selecting device, but the image selecting device is not limited to the tablet. For example, the image selecting device may be an apparatus which senses the relative position of the selected image on the print out not by detecting the pressure but by detecting magnetic force, light, and so on. The image selecting device may also be an apparatus which calculates the relative position of the selected image by integrating movement from an origin. A mark, such as a register mark 65, may be printed on the print out so that the print out is arranged in the predetermined position on the tablet.

As described above, touching the selected image from the plurality of printed images on the print out, recognizing the relative position information of the selected image 62, and the selected image is specified from the plurality of image data; so that the plurality of image data is effectively sorted.

Fourth Embodiment

The present embodiment offers recording medium recording a program software prompting hardware to effectuate the management apparatus 110 according to the embodiments from the first through the third. The hardware to applying the present program may be, for example, a personal computer, a workstation, or any type of the electronic computer.

Figure 14:
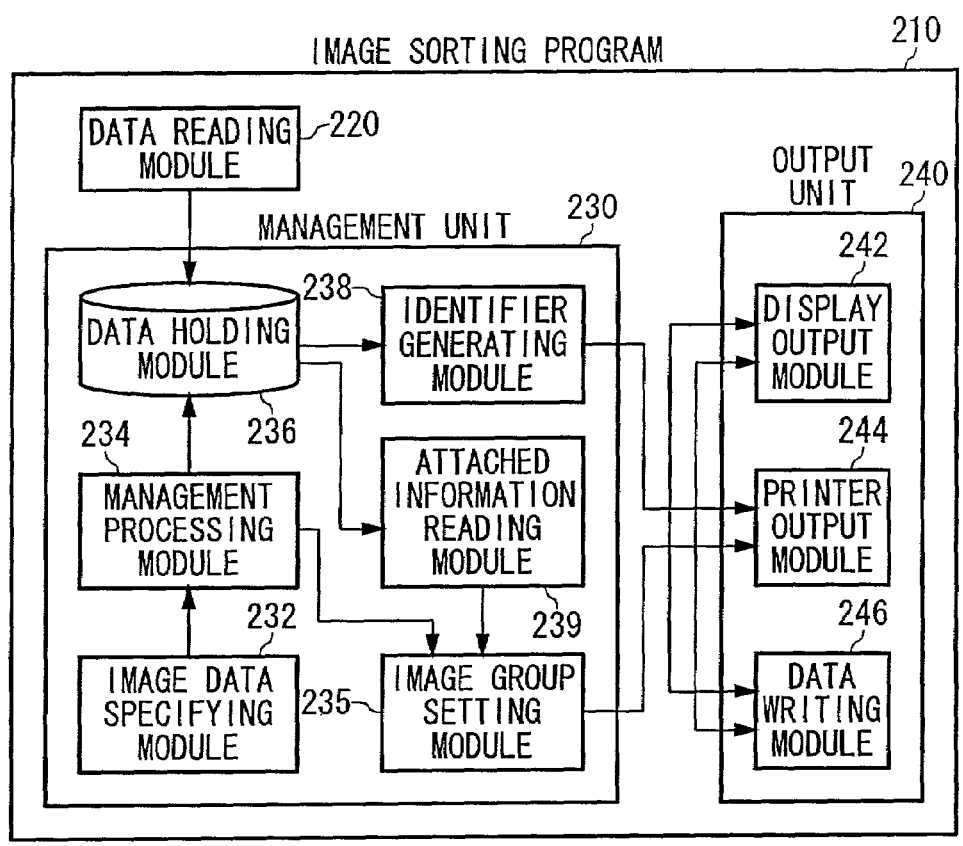
FIG. 14 is a block diagram showing the construction of program software according to the fourth embodiment of the present invention.

FIG. 14 is a block diagram showing the construction of the program software 210 according to the fourth embodiment of the present invention. The present program software is, for example, offered to the user stored in a recording medium such as a CD-ROM. The software stored in the recording medium may be compressed or uncompressed. The program software is, generally speaking, installed from the recording medium to a hard disk in the computer, read into a system memory, and executed.

The present program includes a plurality of program modules each of which processes various functions as shown in FIG. 14. An image sorting program according to the present embodiment has a data reading module 220, a management unit 230, and an outputting module 240.

The management unit 230 has an image selecting module 232, a management processing module 234, a data holding module 236, and an identifier generating module 238. The management unit 230 further has an attached information reading module 239 and an image group setting module 235. The outputting module 240 includes a display outputting module 242, a printer outputting module 244, and a data writing module 246. Each of the above described modules prompts each corresponding hardware to execute the same function as the corresponding blocks shown in FIG. 1.

The CD-ROM as an example of the recording medium may store the whole or a part of the functions performed by the CPU in the computer. The CD-ROM may also store the whole or a part of the functions performed by the other peripheral apparatus. The recording medium, other than the CD-ROM, may also be optic recording media such as DVD and PD, magnetic recording media such as a floppy disk and a mini disk (MD), magneto-optical recording medium such as a MO disk, a tape recording medium, and a nonvolatile memory card. Any recording medium storing above described program is only used for manufacturing the management apparatus 110, therefore it is obvious that manufacturing and providing such recording media as vocation constitutes an infringement on the right of the present invention.

Applying the first embodiment, the bar code is chosen for the index information; however, the index information is not limited to the bar code. For example, letters, marks, and combination of the letters and the marks may be the index information. Applying such letters or marks, an OCR (optical character reader), an OMR (optical mark reader), and so on may be hired for the image selecting device.

When the image data is managed in the above described embodiment, a "directory", which manages data using layers, may be applied instead of the management folder.

As described above, applying the image sorting system according to the embodiments from the first through the fourth of the present invention, a plurality of image data may be managed using a management folder.

The user, with less workload on the display such as matching the images on the display, may send desired image data to the destination management folder. The bar code reader is easy to handle and requires almost no practice for everyone, so that even an inexperienced user may conveniently move the image data. Printing various kinds of the bar codes on the same print out, selecting or sending the image data is intensively and effectively performed on the print out. In particular, using the bar code reader, a large amount of image data may be selected quickly. The user looks at not the display but the printed images on the print out, so that the eyestrain caused from the workload when the user uses the display may be relieved.

The image data is sorted step-by-step, so that a large amount of image data is sorted after narrowing the number of image data before sorting. Therefore, the user sends, without matching printed images with the images on the display, the desired image datum to the destination management folder. Conventionally, sorting the digital images using the display is very laborious than sorting the photographs from the film because of the poor solution of the images on the display. The step-by-step sorting of the image data enables sorting the image data as convenient as the photograph from the film.

Furthermore, grouping the image data based on the attached information, the arrangement information, and so on and moving the plurality of image data in the group at once, sorting the image data is executed effectively and intensively. In particular, a large amount of image data to be broadly sorted is preferable for the step-by-step sorting.

Although the present invention has been described by way of exemplary embodiments, it should be understood that those skilled in the art might make many changes and substitutions without departing from the spirit and the scope of the present invention which is defined only by the appended claims.

What is claimed is:

1. An image sorting system storing a plurality of image data, comprising:
    a management apparatus for managing the plurality of image data using a management folder; and
    an image selecting device for selecting, from a print out, at least one of the plurality of image data in response to a detection of a corresponding at least one identifier, from a plurality of identifiers printed on the print out, which is selected by a user and which corresponds to at least one printed image of the at least one of the plurality of image data on the print out,
    the management apparatus moves or copies the at least one of the plurality of image data selected by the image selecting device to the management folder wherein when the user selects the identifier of the printed image, the management apparatus selects the corresponding image data in response to the detection by said image selecting device of the selection of the user,
    wherein the image selecting device is a pressure detecting device which is associated with the print out and enables the user to select the at least one identifier by detecting pressure against the at least one printed image.

2. The image sorting system as claimed in claim 1, wherein:
    said the management apparatus generates an arrangement information for arranging the plurality of image data corresponding to the plurality of identifiers on the print out, and
    said the management apparatus further comprising a printer output section, which prompts a printer to print the print out based on the arrangement information.

3. The image sorting system as claimed in claim 2, wherein:
    said each identifier of the plurality of identifiers is index information for identifying a corresponding image data of the plurality of image data from the rest of the plurality of image data, in a form detected by the image selecting device, and
    said the printer output section prompts the printer to print the index information with the at least one printed image based on the arrangement information.

4. The image sorting system as claimed in claim 2, wherein:
    the print out includes the at least one printed image corresponding to the at least one of the plurality of image data,
    said the at least one identifier is a relative position information of the at least one printed image on the print out, the image selecting device detects the relative position information of the at least one printed image by detecting pressure against the at least one printed image, and
    said the management apparatus moves or copies the at least one of the plurality of image data to the management folder based on the relative position information detected by the image selecting device.

5. The image sorting system as claimed in claim 2, wherein:
    the plurality of image data has attached information which includes information of image capturing attribute of each of the plurality of image data, and
    said the printer output section arranges the plurality of image data based on the attached information when the printer output section prompts the printer to print the print out.

6. The image sorting system as claimed in claim 5, wherein
    said the management apparatus has an image group setting section for setting up an image group in the plurality of image data based on a predetermined group setting condition,
    when one image data are included in the image group is selected by the image selecting device, the image group setting section moves or copies to the management folder substantially all the image data included in the image group.

7. The image sorting system as claimed in claim 6, wherein the predetermined group setting condition is set based on the attached information.

8. The image sorting system as claimed in claim 6, wherein the predetermined group setting condition is set based on the arrangement information.

9. The image sorting system as claimed in claim 1, wherein:
said each of the at least one identifier includes a destination identifier for indicating the management folder which is a destination of the corresponding at least one of the plurality of image data, and
said the management apparatus moves or copies each of the at least one of the plurality of image data to the management folder indicated by the corresponding destination identifier.

10. The image sorting system as claimed in claim 1, wherein the management apparatus creates a new management folder and then moves or copies the at least one plurality of image data selected by the image selecting device to the new management folder.

11. The image sorting system as claimed in claim 1,
wherein the management apparatus comprises a display output section for displaying a virtual print out corresponding to the print out, and
wherein the display output section changes the virtual print out in response to the selection by the image selecting device.

12. A sheet like member for sorting a plurality of image data, comprising;
a plurality of identifiers, each of the plurality of identifiers arranged in a predetermined unique position on the sheet like member,
wherein the position of each of the plurality of identifiers corresponds to a relative position of one of a plurality of images on a print out on which the plurality of images are printed in a form such that correspondence to the plurality of identifiers is detected, the plurality of images represents the plurality of image data,
wherein the plurality of image data is sorted by moving or copying a selected at least one of the plurality of image data to a management folder, the selected at least one of the plurality of image data is selected by an image selecting device in response to a detection of at least one of the plurality of identifiers from the sheet like member wherein the identifier is selected by a user and corresponds to one of the plurality of image data,
wherein the image selecting device is a tablet.

13. The sheet like member as claimed in claim 10, wherein the each of the plurality of identifiers is a relative position on the print out.

14. The sheet like member as claimed in claim 10, wherein a new management folder is created and then the at least one of the plurality of image data selected by the image selecting device are moved or copied to the new management folder.

15. The sheet like member as claimed in claim 10,
wherein a virtual print out corresponding to the print out is displayed on a display section, and
wherein the virtual print out in response to the selection of the at least one of the plurality of image data.

* * * * *